United States Patent [19]

Hegadorn

[11] 4,001,457
[45] Jan. 4, 1977

[54] METHOD OF MAKING A GASIFIED CONFECTION
[75] Inventor: Joseph L. Hegadorn, Ridgewood, N.J.
[73] Assignee: General Foods Corporation, White Plains, N.Y.
[22] Filed: July 1, 1976
[21] Appl. No.: 701,835
[52] U.S. Cl. .............................. 426/572; 426/660; 426/474
[51] Int. Cl.$^2$ .......................................... A23G 3/00
[58] Field of Search ................... 426/572, 660, 474
[56] References Cited
UNITED STATES PATENTS

| | | | |
|---|---|---|---|
| 1,601,302 | 9/1926 | Farley | 426/572 |
| 3,012,893 | 12/1961 | Kremzner | 426/572 |

*Primary Examiner*—Jeanette M. Hunter
*Attorney, Agent, or Firm*—Richard Kornutik

[57] ABSTRACT

Preparing a gasified confection by incorporating a gas into a hot candy (sugar) melt within a pressure vessel at superatmospheric pressure. The gasified hot melt is transferred from the pressure vessel to a cooling tube which has a polished inner surface, through a line or lines connecting the bottom of the pressure vessel to the bottom of the tube, by creating pressure differential between the cooling tube and the pressure vessel while venting the top of the tube to the atmosphere. When the transfer is complete, the cooling tube is isolated and the pressure within it is maintained at superatmospheric and it is cooled to a temperature below 70° F. whereby the gasified hot melt becomes a gas-containing solid matrix. Next, the cooling tube is vented to atmospheric conditions.

9 Claims, No Drawings

METHOD OF MAKING A GASIFIED CONFECTION

BACKGROUND OF THE INVENTION

This invention relates to the production of carbonated candy which is a hard candy containing carbon dioxide gas as disclosed in U.S. Pat. No. 3,012,893 and U.S. Ser. No. 618,603 which are herein incorporated by reference. Such a candy is made by the process which comprises fusing a fusible sugar, contacting such fusible sugar with gas at a pressure of 50–1000 p.s.i.g. for a time sufficient to permit absorption in said sugar of 0.5–15 milliliters of gas per gram of sugar, maintaining the temperature of said sugar during said absorption above the solidification temperature of said fused sugar and cooling said sugar under pressure to a temperature less than its fusing temperature thereby obtaining a gas-containing solid.

In U.S. Pat. No. 3,012,893, the process is carried out within a Parr reactor (a thick-shelled pressure vessel having a stirrer). The temperature of the mixture in the Parr reactor is generally maintained above 212° F. Carbon dioxide, which is the preferred gas, is admitted to the reactor to pressurize it to 600 p.s.i.g. The mixture is then agitated for 5 to 10 minutes. The 600 p.s.i.g. is maintained within the reactor and it is cooled to about 70° F. The Parr reactor is now opened and the product within must be removed manually by breaking it into small sections with means such as an ice pick. Pieces of carbonated candy thus removed vary greatly in size.

U.S. Ser. No. 618,603 discloses a method of cooling the hot melt in a separate pressure vessel. The removal of the solidified candy is still a difficult task. The cooling vessel must be impacted to break the solidified mass. Such impact usually causes a major portion of the solid matrix to be reduced to granular form. However, much material remains adhering to the walls of the pressure vessel. Occasionally large amounts of product remain segmented or isolated within the tube. It is then necessary to manually remove the solidified product from the tube. Often the product is so tightly packed in the tube that the only viable method of removal is to wash down the entire cooling tube. The above problems result in non-uniform product quality and size and, of course, much waste and loss of production.

Therefore, it would be highly desirable if a simple method were devised which would permit complete uniform removal of the product from the cooling tube.

SUMMARY OF THE INVENTION

This invention relates to a method of making a granular carbonated candy. A hot candy melt is gasified in a first pressure vessel. Next, while the melt is still at elevated temperature and pressure, it is transferred to a second pressure vessel which has polished inner surfaces. The product is passed from the first pressure vessel through a line to the bottom of the second pressure vessel which is initially maintained at a temperature and pressure equivalent to the first vessel. The transfer is effected by maintaining the superatmospheric pressure in the second pressure vessel at a value lower than the superatmospheric pressure in the first pressure vessel and venting the top of the second pressure vessel to atmosphere. When the transfer is complete, the vent is closed and the second pressure vessel is isolated. Next, the second pressure vessel is cooled to a temperature below 70° F. while maintaining superatmospheric pressure within the vessel so that the gasified hot melt becomes a gas-containing solid matrix. Next, the second pressure vessel is vented to atmosphere so that the sudden change in pressure causes the gas-containing solid matrix to shatter into multiple fragments and release from the inner polished surfaces of the cooling vessel.

DETAILED DESCRIPTION OF THE INVENTION

According to the process of this invention, a first pressure vessel is charged with the hot candy melt. The melt is maintained at a temperature above 200° and preferably between 315° and 325° F. Into the vessel is admitted a gas at superatmospheric pressure, between 50 p.s.i. and 1,000 p.s.i., and preferably between 550 p.s.i. to 650 p.s.i. Agitation of the melt, plus the pressure of the gas, preferably carbon dioxide, causes the gas to be incorporated within a candy melt. A second pressure vessel which has polished inner surfaces is connected to the first pressure vessel by means of a line or manifold of lines, said line or lines having means to isolate the vessels from each other. Typically, a ball valve is placed in a line connecting the two vessels. While the candy melt is being gasified in the first pressure vessel, the valve is in the closed position. A gas, preferably the same as in the first vessel, is admitted to the second vessel so that there is no pressure differential between the two vessels. Thus, at the end of the mix cycle, when the valve and the line connecting the two vessels is opened, no transfer takes place.

The gas inlet on both vessels is located in their topmost portion. The connecting line goes from the bottom of the first tank to the bottom of the second tank. Regulator valves are used on the gas lines to maintain particular pressures. The second vessel has a venting means on its topmost portion. To accomplish the transfer between the vessels, the regulator on the first vessel is set to a value slightly higher than the second vessel, i.e., 650 p.s.i. vs. 600 p.s.i., and the vent on the second vessel opened. The exact pressure differential selected may, of course, vary and is typically within the range of say 5 p.s.i. to 150 p.s.i. The pressure differential and the venting causes the candy melt to transfer from the first vessel to the second vessel.

In the preferred embodiment of this invention, the configuration of the second pressure is a cylindrical tube or pipe with a diameter of 4½ inches and a length of 144 inches. It is constructed to withstand pressures of at least 1000 p.s.i. at temperatures up to about 400° F. The exterior is jacketed to provide for the circulation of an appropriate cooling medium such as water, propylene glycol or liquid ammonia. The top and bottom of the tube are provided with flanges to provide access and to permit the removal of the product. The interior walls are nickel plated and polished to a smooth surface.

It is important that the pressures between the two tubes be equalized prior to opening the valve and the line connecting them. This prevents flashing of the melt or boiling of the mixture. At all times the candy solution must be maintained at superatmospheric pressure prior to cooling and the subsequent transformation of the melt to a crystal structure. It is preferable to maintain the pressure in the cooling tube at a constant value prior to removing the cooled product from the tube. It is most preferable to maintain the pressure in the cooling tube at least as high as the original gasifying pressure. If this is not done, the product will lose the entrapped gas. The transfer line allows the candy melt to exit the bottom of the first vessel and enter the bottom of the second vessel. The venting means is typically a needle valve or other means which permits precise control over the exiting gas. The amount of gas vented in equivalent to the volume of the candy melt which is transferred. Thus, at the end of the transfer cycle, the valve in the connecting line between the vessels is closed. The first vessel can now be depressurized and used to begin gasifying another charge of candy melt. One mixing pressure can thus be used to supply gasified product to a number of cooling tubes.

The candy melt in the second pressure vessel is allowed to cool to a temperature below 100° F. and preferably below 70° F., all the while maintaining the pressure at the original gasifying pressure, i.e. 600 p.s.i. At this point in the process, prior art workers would vent the cooling tube and next attempt to remove the product of the interior of the tube and reduce the matrix to multiple fragments by impacting the sidewalls of the tube typically with a sledge hammer. The product tenaciously adheres to the inner surfaces of the cooling tube. Removal of all product is difficult and often incomplete. The excessive shock treatment necessary to remove the candy has a detrimental effect on product quality. Typically, 50–60% of the product when shock treatment is employed is fines (particle sizes which are too small to be included with the final product).

According to the process of the instant invention, polished inner surfaces of the cooling tube permit the product to immediately be released from the sidewalls and break into multiple fragments simply by venting the tube to atmosphere. The design of the cooling tube should be such that the width/length ratio is at least 20 to 1. Ratios between 20 to 1 and 60 to 1 may be employed with the preferred range of between 40 to 1 and 50 to 1. The interior surfaces of the tube are plated and polished so that they are smooth and free from any irregularities. The amount of fines from the finished product is greatly reduced according to the process of the instant invention.

EXAMPLE

Candy melt is prepared by mixing 35¾ pounds of sucrose, 19¼ pounds of corn syrup, 13 pounds of water and 8 grams of food coloring in a 15-gallon kettle. The mixture is heated to between 315° F. to about 325° F. to remove water to a level below about 2%. The melt is charged to a preheated Dependable Welding Service autoclave and 31.5 milliliters of artifical flavor is added. The autoclave is sealed and carbon dioxide at a pressure of 600 p.s.i. is introduced to the headspace between the liquid level of the candy melt and the top of the autoclave. An agitator which is vertically mounted through the top portion of the autoclave is operated for 5 minutes. A jacketed cooling tube, which is 4½ inches in diameter and 170 inches in height, is vertically mounted adjacent to the autoclave. A 1-inch jacketed line with a ball valve at its mid-point connects the bottom of the autoclave with the bottom of the cooling tube. The ball valve is in a closed position. The tube is pressurized with $CO_2$ to 600 p.s.i. With both vessels at 600 p.s.i. and the mixing complete, the ball valve is opened. Next, the pressure in the autoclave is increased to 650 pounds and a needle valve which vents the top of the cooling tube to atmosphere is slowly opened. When all of the candy melt is transferred to the cooling tube, the ball valve and then the vent needle valve is closed. Water, at 60° F., is circulated in the jacket of the cooling tube for 3 hours to reduce the temperature of the product to 70° F. The product at this temperature exists as a solid gas-containing matrix.

The cooling water and gas lines are disconnected and the cooling tube is vented to atmosphere. This sudden change in pressure within the tube causes the matrix to shatter into granular particles which are relatively uniform in size.

The resultant product is a hard candy containing carbon dioxide gas which when placed in the mouth produces an entertaining popping sensation. The particles are granular in form and relatively uniform in size.

I claim:

1. A method of making a carbonated candy which comprises:
   a. obtaining a hot candy melt,
   b. introducing the hot melt into a first pressure vessel,
   c. introducing a gas at superatmospheric pressure into the first pressure vessel so that the gas is dispersed within the hot melt,
   d. introducing a gas at superatmospheric pressure into a second pressure vessel which has polished inner surfaces at a value equivalent to the pressure within the first pressure vessel, the first and second pressure vessels having a connecting line with valve means between the first vessel and the bottom of the second vessel,
   e. transferring the gasified hot melt to the second pressure vessel through the connecting line by opening said valve means and then creating a pressure differential between the two vessels, said differential being effected by regulating the superatmospheric pressure in the second pressure vessel at a value lower than the superatmospheric pressure in the first pressure vessel and venting the top of the second pressure vessel,
   f. isolating the second pressure vessel while continuing to maintain a superatmospheric pressure,
   g. cooling the second pressure vessel so that the gasified hot melt becomes a gas-containing solid matrix,
   h. venting the second pressure vessel which causes the matrix to shatter into multiple fragments, and
   i. opening the second pressure vessel to allow the product to be removed.

2. The method of claim 1 wherein the gas is carbon dioxide.

3. The method of claim 2 wherein the superatmospheric pressure is maintained between 50 p.s.i. and 1000 p.s.i.

4. The method of claim 3 wherein the pressure differential maintained during transfer is 5 p.s.i. to 150 p.s.i.

5. The method of claim 4 wherein the temperature of the melt is at least 212° F.

6. The method of claim 5 wherein the amount of gas dispersed within each gram of melt is 0.5 ml. to 15.0 ml.

7. The method of claim 6 wherein the shock treatment of the second pressure vessel is effective to shatter the gas-containing solid matrix into granular particles which are relatively uniform in size.

8. The method of claim 7 wherein the second pressure vessel is vented to atmosphere through means which permit precise control over the exiting gas.

9. The method of claim 8 wherein the pressure in the second pressure vessel is maintained at a constant value from steps (d) through (f).

* * * * *

UNITED STATES PATENT AND TRADEMARK OFFICE
CERTIFICATE OF CORRECTION

PATENT NO. : 4,001,457
DATED : January 4, 1977
INVENTOR(S) : Joseph L. Hegadorn

It is certified that error appears in the above-identified patent and that said Letters Patent are hereby corrected as shown below:

In column 3, line 11, after "pressure" insert -- vessel --; line 50, change "artifical" to -- artificial -- .

Signed and Sealed this

Fourteenth Day of June 1977

[SEAL]

Attest:

RUTH C. MASON
*Attesting Officer*

C. MARSHALL DANN
*Commissioner of Patents and Trademarks*